(12) United States Patent
Hioki et al.

(10) Patent No.: US 7,868,545 B2
(45) Date of Patent: Jan. 11, 2011

(54) DISPLAY DEVICE

(75) Inventors: Tsuyoshi Hioki, Yokohama (JP);
Shuichi Uchikoga, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 834 days.

(21) Appl. No.: 11/776,018

(22) Filed: Jul. 11, 2007

(65) Prior Publication Data

US 2008/0018631 A1    Jan. 24, 2008

(30) Foreign Application Priority Data

Jul. 24, 2006    (JP) .............................. 2006-200716

(51) Int. Cl.
*H01J 1/62* (2006.01)
(52) U.S. Cl. .......................... 313/511; 257/59; 313/504; 340/691.1
(58) Field of Classification Search ................... 257/59; 340/691.1; 361/600; 313/500–512
See application file for complete search history.

(56) References Cited

U.S. PATENT DOCUMENTS

| | | | |
|---|---|---|---|
| 6,831,727 B2 | 12/2004 | Akiyama et al. | |
| 6,987,284 B2 * | 1/2006 | Hioki et al. | 257/59 |
| 7,109,967 B2 | 9/2006 | Hioki et al. | |
| 7,710,030 B2 * | 5/2010 | Lee | 313/511 |
| 2003/0164679 A1 * | 9/2003 | Hamano et al. | 313/504 |
| 2008/0055831 A1 * | 3/2008 | Satoh | 361/681 |
| 2008/0218369 A1 * | 9/2008 | Krans et al. | 340/691.1 |

FOREIGN PATENT DOCUMENTS

| | | | |
|---|---|---|---|
| JP | 10082993 A * | 3/1998 | |
| JP | 2002-278466 | 9/2002 | |
| WO | WO 2006/090434 A1 | 8/2006 | |

* cited by examiner

*Primary Examiner*—Nimeshkumar D Patel
*Assistant Examiner*—Mary Ellen Bowman
(74) *Attorney, Agent, or Firm*—Oblon, Spivak, McClelland, Maier & Neustadt, L.L.P.

(57) ABSTRACT

It is made possible to provide a low-cost highly reliable display device which does not lose the flexibility of itself and which can transmit the allowable range of the flexibility to the user. A display device includes: a display part having a display face and being flexible; and a restriction part having a plurality of first convex parts to restrict a bending quantity of the display part.

8 Claims, 17 Drawing Sheets

DISPLAY DEVICE

CROSS-REFERENCE TO RELATED APPLICATION

This application is based upon and claims the benefit of priority from prior Japanese Patent Application No. 2006-200716 filed on Jul. 24, 2006 in Japan, the entire contents of which are incorporated herein by reference.

BACKGROUND OF THE INVENTION

1. Field of the Invention

The present invention relates to a flexible display device.

2. Related Art

In the display devices, the so-called flat panel implementation having a small depth aspect ratio relatively to the area of display as represented by liquid crystal displays and plasma display panels is promoted. Thus, thin TV sets and various mobile applications have been implicated.

In addition, as for future display devices, research and development of flexible display devices which themselves are provided with flexibility to have a further degree of freedom are promoted. Owing to the use of the display device having flexibility, it is possible to improve the accommodation property by utilizing the flexibility and rounding or folding the display device when it is not used and improve the convenience at the time of transportation.

For example, it becomes possible to implement a novel sensuous analog input function by adding a pressure sensitive sensor to a flexible display device and detecting the amount of bending given to the display device by the user arbitrarily (see, for example, JP-A 2004-46792 (KOKAI)). The display device raises the convenience when the user carries it and facilitates the human interface. Thus it is considered that the display device can largely contribute to implementation of novel digital products. A key device which implements the novel digital products is a flexible display device. Liquid crystal displays and organic electroluminescence displays which are excellent in flexibility and reflection display devices called electronic paper are implemented by changing support substrates from conventional glass substrates to support substrates having excellent flexibility such as plastics. As for them, a search for optimization of the support substrate material and the structure, an array technique for matrix operation, and an electro-optic effect layer which has a higher efficiency and which can ensure reliability is being promoted at the present time, aiming to improve more flexibility.

In electronic devices, the range of flexibility in which their function can be maintained (hereafter simply referred to as flexibility range) is finite in many cases. The reason is that, for example, internal stress generated by bending brings about generation of defects and cracks which cause function breakdown in the electro-optic layer or the active matrix layer. In input devices utilizing the flexibility as well, the function range is restricted. In the user, however, the operation for the flexibility is sensuous, and the flexibility range of the display device or the display device provided with the input function is hard to intentionally control. For example, in the case where the display device is provided with a pressure sensitive sensor and the amount of bending is used as an analog input, there is a possibility that the user might give an amount of bending exceeding a limit value which can be allowed by the display device in one's eagerness to ensure a greater input value. At this time, there is a risk that the display device will not be able to withstand the amount of bending and, for example, function lowering such as display performance degradation or damage of the display device itself might be caused. Therefore, it is necessary to transmit the flexibility range of the display device to the user by using some method.

In the conventional flat panel, its plane stability is ensured by providing a member located in a peripheral part of the display device called casing with needed rigidity. However, it is not effective to the display device having flexibility, because providing the casing itself with rigidity deprives the display device itself of the flexibility.

If the casing is provided with a function of limiting the flexibility range of the display device, the casing itself becomes complicated and large-scaled. As a result, the thinness with light weight which is one of features of the flexible display device is sacrificed. In addition, the cost required to fabricate the casing is also increased. Therefore, it is desirable to form a casing having a minimum required function such as a dampproofing property, in a state in which the flexibility is more excellent so as not to give unnecessary stress to the display device.

SUMMARY OF THE INVENTION

The present invention has been made in view of these circumstances, and an object thereof is to provide a low-cost highly reliable display device which does not lose the flexibility of itself and which can transmit the allowable range of the flexibility to the user.

A display device according to a first aspect of the present invention includes: a display part having a display face and being flexible; and a restriction part comprising a plurality of first convex parts to restrict a bending quantity of the display part.

A display device according to a second aspect of the present invention includes: a display part having a display face and being flexible; and a restriction part configured to restrict a bending quantity of the display part, and comprising a flexible first support substrate, a second support substrate provided so as to be opposed to the first support substrate, and a plurality of first convex parts provided on a face of the first support substrate opposed to the second support substrate, and the first support substrate and the second support substrate being held so as to have a gap between the first convex parts and the second support substrate.

A display device according to a third aspect of the present invention includes: a display part having a display face and being flexible; and an optical control part provided on the display face side of the display part or on the opposite side to control so as to change light emitted from the display face of the display part according to the bending quantity of the display part.

DETAILED DESCRIPTION OF THE INVENTION

Hereafter, embodiments of the present invention will be described with reference to the drawings.

First Embodiment

Figure 1:
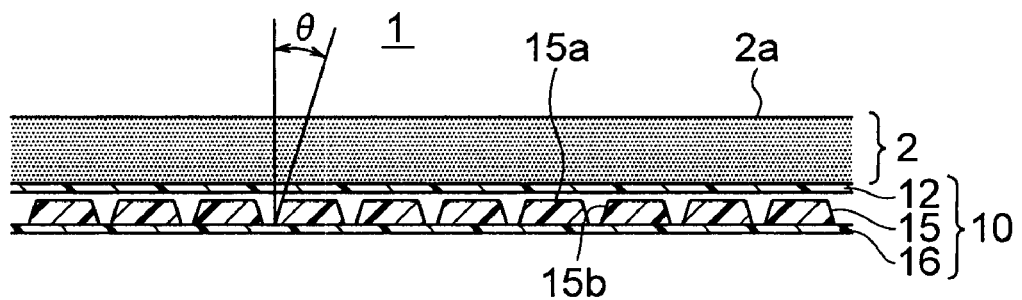
FIG. 1 is a cross-sectional view of a display device according to a first embodiment of the present invention.

A cross-sectional view of a display device according to a first embodiment of the present invention is shown in FIG. 1. A display device 1 according to the present embodiment includes a flexible display part 2 having pixels arranged in a matrix form and a restriction part 10 which limits the amount of bending of the display part 2 when it is bent. The restriction part 10 includes flexible support substrates 12 and 16 provided on and over a face of the display part 2 opposite to a display face 2a, and a plurality of convex parts 15 provided on a surface of the support substrate 16 opposite to the support substrate 12. The convex parts 15 are formed to cause interference by coming in contact with adjacent convex parts when the display part 2 is deformed so as to reach a predetermined amount of bending.

Each of the convex parts 15 includes side faces 15b inclined inside relative to a direction perpendicular to the display face 2a of the display part 2. In other words, each of the convex parts 15 includes side faces 15b inclined inside relative to a top face 15a of the convex part 15 and having an inclination angle θ as shown in FIG. 1. In the display device according to the present embodiment, the amount of bending obtained when the display part 2 is bent to take a concave shape is controlled by controlling the inclination angle θ.

Figure 2:
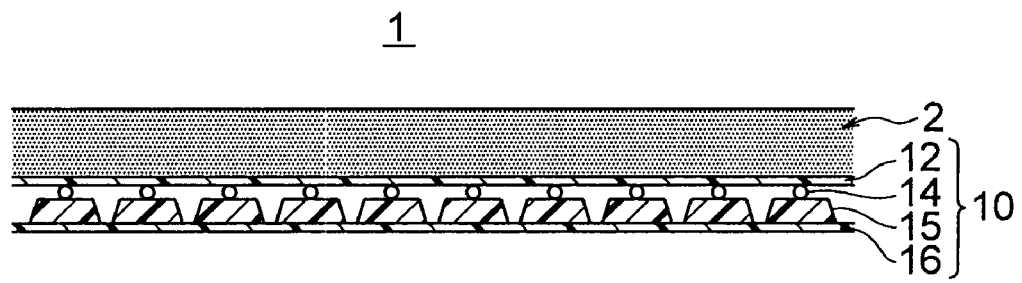
FIG. 2 is a cross-sectional view of a display device according to a modification of a first embodiment of the present invention.
Figure 3:
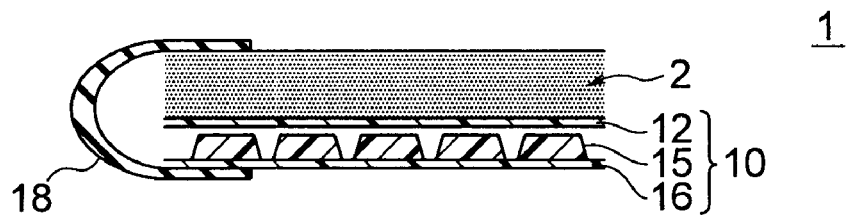
FIG. 3 is a cross-sectional view showing an end part of the display device according to the first embodiment.

The support substrate 12 and the top faces 15a of the convex parts 15 are held so as to have a predetermined spacing between them. This holding is conducted by, for example, disposing globular spacers 14 between the convex parts 15 and the support substrate 12 as shown in FIG. 2. In addition, ends of the display part 2 and the restriction part 10 are sealed by a seal part 18 as shown in FIG. 3. The seal part 18 is formed of a flexible material having flexibility (for example, butadiene rubber). Therefore, the display part 2 and the restriction part 10 are formed so as to bend as one body.

Figure 4:
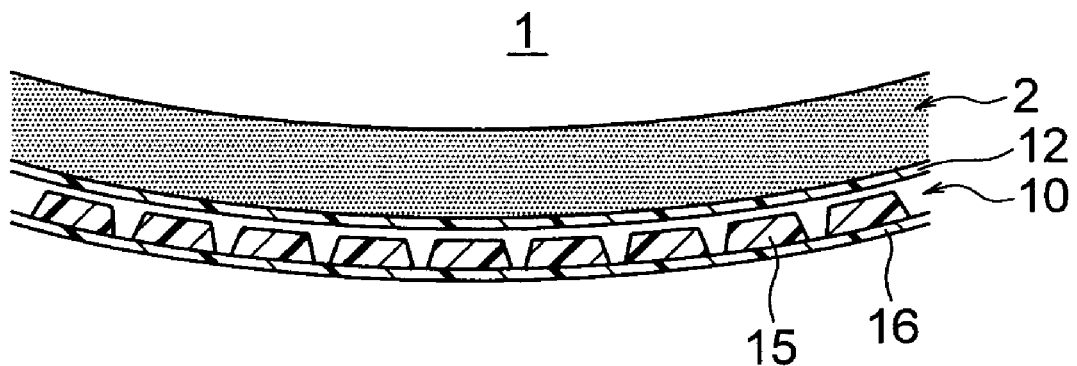
FIG. 4 is a cross-sectional view for explaining operation of the display device according to the first embodiment.

If the convex parts 15 are deformed in such a range that they do not interfere with each other as shown in FIG. 4, the restriction part 10 in the present embodiment is made flexible by applying external force of such a degree that is prescribed by the material properties of the support substrates 12 and 16 and their thicknesses. Within the limits of the flexibility the restriction part 10 has, therefore, the user can deform the display device 1 to take a shape desired by the user by giving external force for bending the display device 1 and the restriction part 10.

Figure 5:
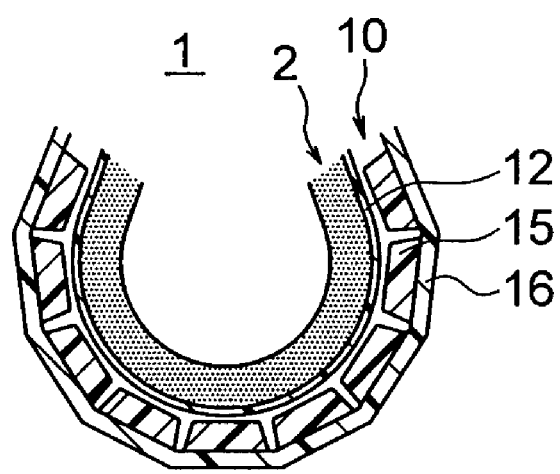
FIG. 5 is a cross-sectional view for explaining operation of the display device according to the first embodiment.

If the convex parts 15 are deformed to such a degree that they interfere with each other as shown in FIG. 5, however, the restriction part 10 cannot be further deformed unless external force prescribed by the material properties of the convex parts 15 and their thicknesses is applied in addition to the external force of such a degree that is prescribed by the material properties of the support substrates 12 and 16 and their thicknesses, unlike the case shown in FIG. 4. For deforming the display device 1 so as to exceed the deformation state prescribed by the convex parts 15 in the restriction part 10, therefore, it is necessary for the user to further give the external forces of the two kinds to the display device 1.

Figure 6:
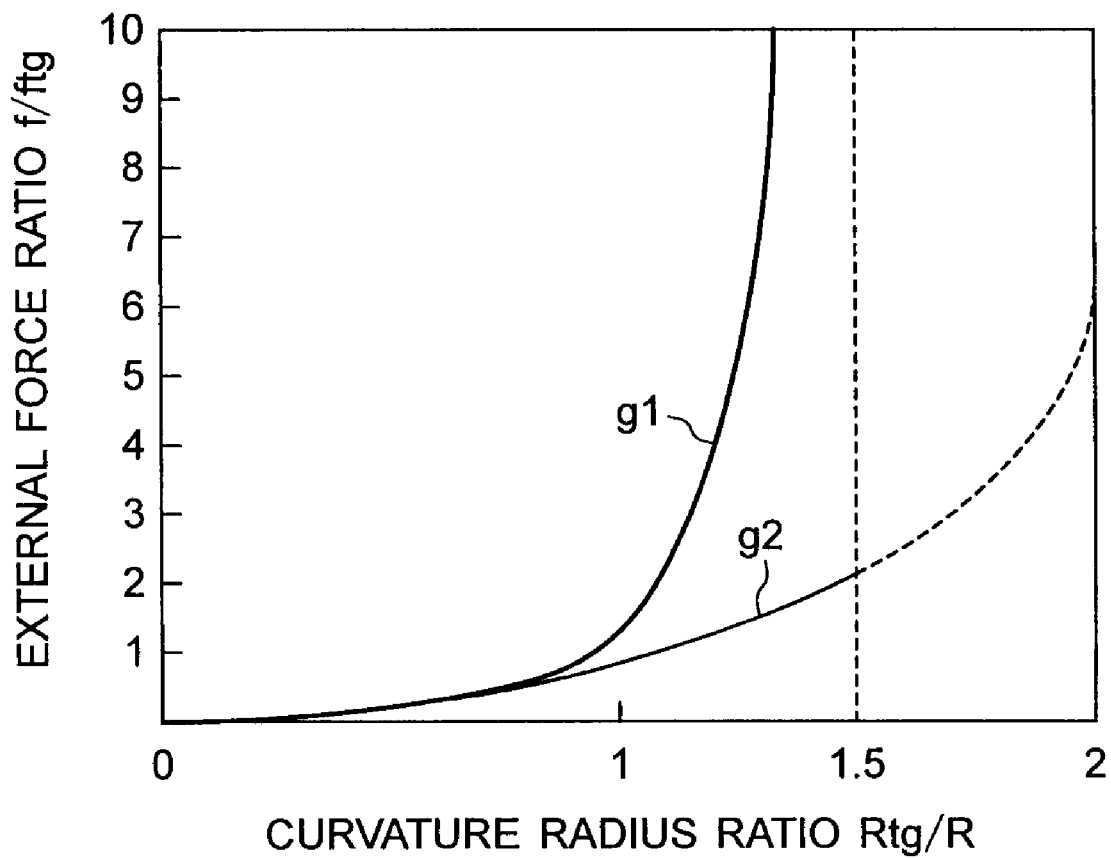
FIG. 6 is a diagram for explaining effect of the display device according to the first embodiment.

This will now be described in more detail with reference to FIG. 6. A radius of curvature obtained when the display device 1 according to the present embodiment is bent is denoted by R, and external force at this time is denoted by f. A radius of curvature of the display device 1 at a usable flexibility limit in the flexibility range of the display device 1 is denoted by Rtg and external force at this time is denoted by ftg. Here, the radius R of curvature of the display device 1 means a radius of curvature at a joint surface between the display part 2 and the restriction part 10. In FIG. 6, the abscissa indicates Rtg/R, and the ordinate indicates f/ftg. In FIG. 6, a graph g1 indicates the case of the display device 1 according to the present embodiment, and a graph g2 indicates the case of the display device which is not provided with the restriction part 10 including a plurality of convex parts 15, i.e., the case of the conventional flexible display device. In the case where the restriction part 10 is not provided, i.e., in the case of the conventional display device, a change quantity of the external force f relative to the curvature radius R is small even if the user operates in the vicinity of the curvature radius Rtg at the usable flexibility limit (i.e., in the vicinity of a point where Rtg/R is unity) as indicated by the graph g2 in FIG. 6. Therefore, it is difficult for the user to sensuously detect the curvature radius Rtg at the usable flexibility limit.

On the other hand, in the case of the display device 1 according to the present embodiment having the restriction part 10, the change quantity of the external force f relative to the radius R of curvature changes abruptly in the vicinity of the radius Rtg of curvature at the usable flexibility limit, as indicated by the graph g1. Therefore, the user can sensuously detect the usable range. Thus, it becomes possible to prevent degradation of the display function or damage of the display device itself at the time of use of the display device 1.

For example, it is now supposed that such degradation or damage occurs at Rtg/R=1.5 in FIG. 6. In the conventional display device, the change of the external force f is gradual until Rtg/R=1.5 is reached. Therefore, the absolute value of the external force f causing degradation or damage is reached if the external force f increases to approximately twice that at Rtg/R=1.0.

On the other hand, in the display device according to the present embodiment, a change quantity required to shift from Rtg/R=1.0 to Rtg/R=1.5 is very large. As for the absolute value of the external force f causing degradation or damage, large external force f which is several tens times that in the case where Rtg/R=1.0 is needed. Therefore, the user can sensuously find the usable range. Thus, it becomes possible to prevent degradation of the display function or damage of the display device itself at the time of use of the flexible display device.

Second Embodiment

Figure 7:
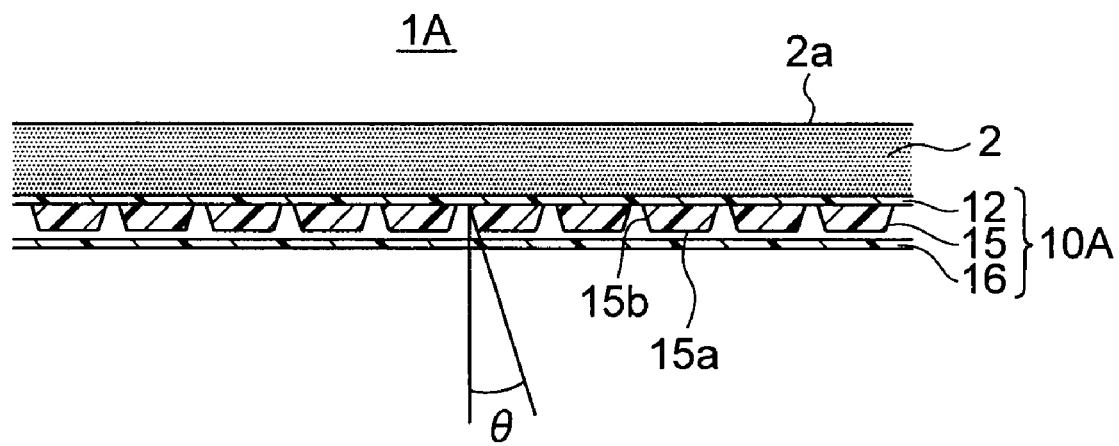
FIG. 7 is a cross-sectional view of a display device according to a second embodiment of the present invention.

A cross-sectional view of a display device according to a second embodiment of the present invention is shown in FIG. 7.

A display device 1A according to the present embodiment has a configuration obtained by replacing the restriction part 10 included in the display device 1 according to the first embodiment shown in FIG. 1 with a restriction part 10A. The restriction part 10A has a configuration obtained from the restriction part 10 shown in FIG. 1 by providing the convex parts 15 on the face of the support substrate 12 opposed to the support substrate 16. Since the configuration of other portions is the same as that of the display device 1 according to the first embodiment, its description will be omitted.

Each of the convex parts 15 includes side faces 15b inclined inside relative to a direction perpendicular to the display face 2a of the display part 2. In other words, each of the convex parts 15 includes side faces 15b inclined inside relative to a top face 15a of the convex part 15 and having an inclination angle θ as shown in FIG. 7. In the display device 1A according to the present embodiment, the amount of bending obtained when the display part 2 is bent to take a convex shape is controlled by controlling the inclination angle θ.

Figure 8:
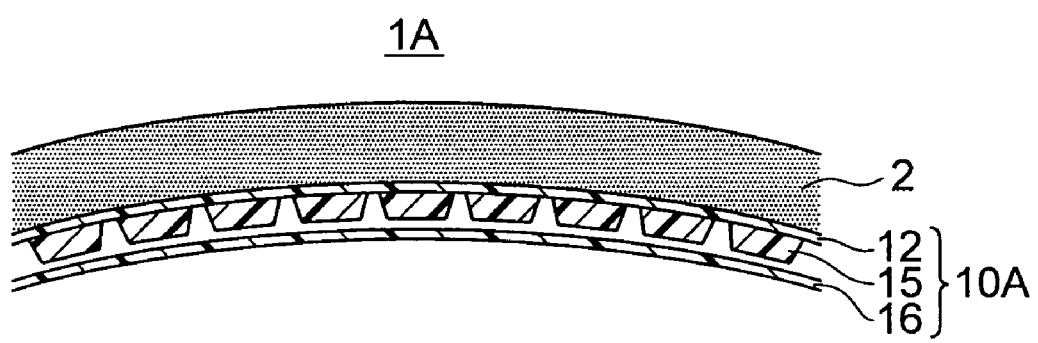
FIG. 8 is a cross-sectional view for explaining operation of the display device according to the second embodiment.

If the convex parts 15 are deformed in such a range that they do not interfere with each other as shown in FIG. 8, the restriction part 10A in the present embodiment is made flexible by applying external force of such a degree that is prescribed by the material properties of the support substrate 12 and its thickness. Within the limits of the flexibility the restriction part 10A has, therefore, the user can deform the display device 1A to take a shape desired by giving external force from the user for bending the display device 1A and the restriction part 10A.

Figure 9:
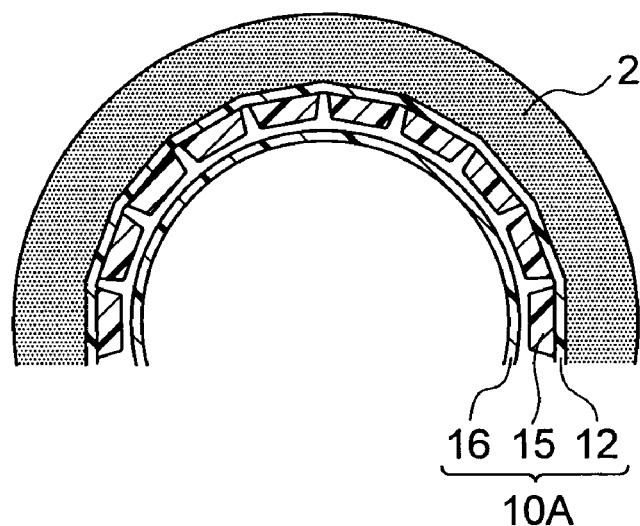
FIG. 9 is a cross-sectional view for explaining operation of the display device according to the second embodiment.

If the convex parts 15 are deformed to such a degree that they interfere with each other as shown in FIG. 9, however, the restriction part 10 cannot be further deformed unless external force prescribed by the material properties of the convex parts 15 and their thicknesses is applied in addition to the external force of such a degree that is prescribed by the material property of the support substrate 12 and its thickness, unlike the case shown in FIG. 8. For deforming the display device 1A so as to exceed the deformation state prescribed by the convex parts 15 in the restriction part 10A, therefore, it is necessary for the user to further give the external forces of the two kinds to the display device 1A.

In the present embodiment, the present invention can be applied to the display device in which the display part 2 is bent to take a convex shape, in the same way by providing the above-described configuration.

Third Embodiment

Figure 10:
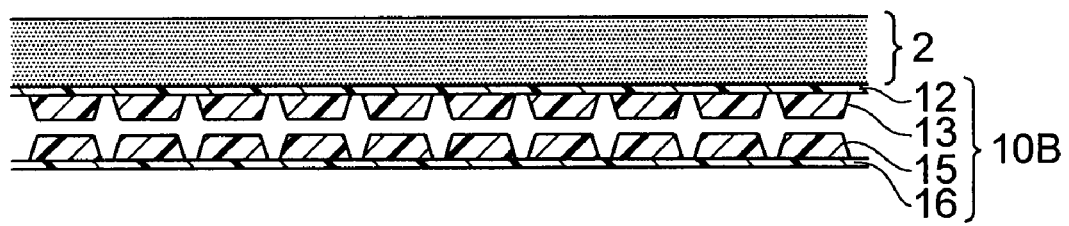
FIG. 10 is a cross-sectional view of a display device according to a third embodiment of the present invention.

A cross-sectional view of a display device according to a third embodiment of the present invention is shown in FIG. 10. A display device 1B according to the present embodiment has a configuration obtained by replacing the restriction part 10 included in the display device 1 according to the first embodiment shown in FIG. 1 with a restriction part 10B. The restriction part 10B has a configuration obtained from the restriction part 10 shown in FIG. 1 by providing a plurality of convex parts 13 on the face of the support substrate 12 as well. The convex parts 13 are arranged on the flexible support substrate 12, and are formed so as to cause interference between adjacent convex parts by contact or the like at a predetermined amount of bending of the display part 2. Since the configuration of other portions is the same as that of the display device 1 according to the first embodiment, its description will be omitted.

Figure 11A:
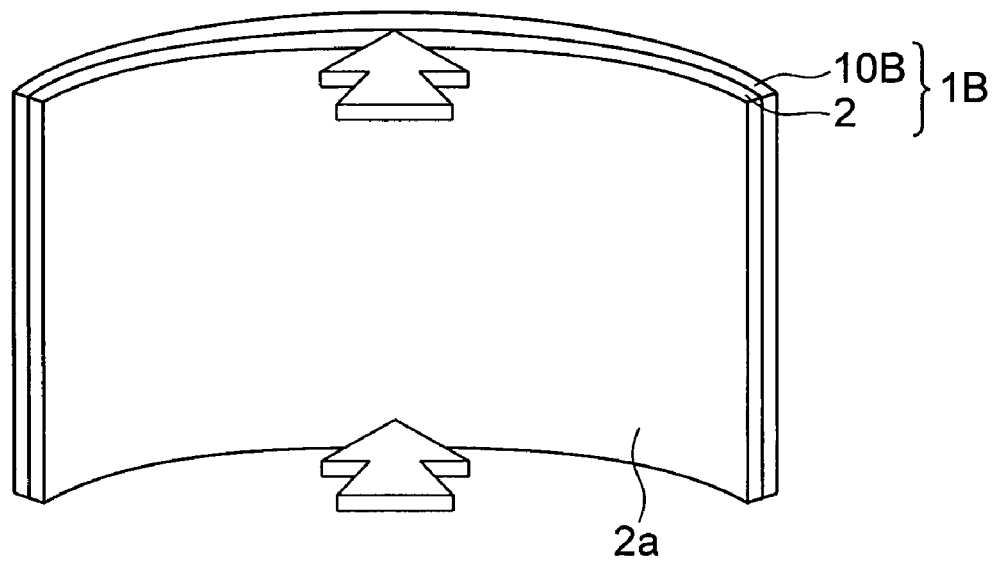
FIGS. 11A and 11B are oblique views for explaining bending directions of the display device according to the third embodiment.
Figure 11B:
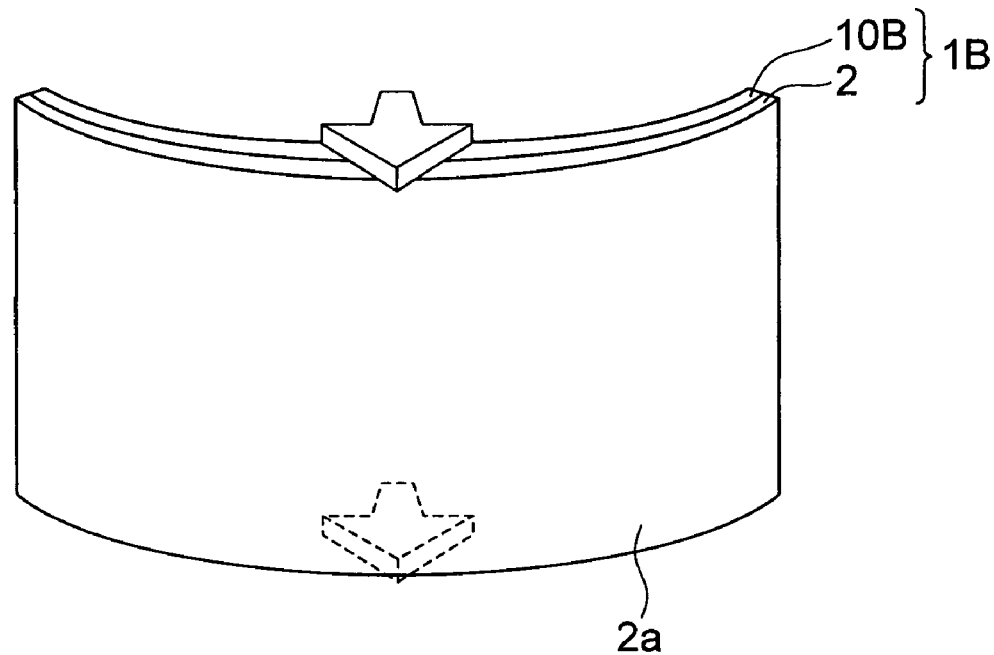

It is possible to deform the display device 1B so as to cause the display face 2a of the display part 2 to take a concave shape as shown in FIG. 11A and deform the display device 1B so as to cause the display face 2a of the display part 2 to take a convex shape as shown in FIG. 11B, by thus providing the convex parts 13 and 15 respectively on the support substrates 12 and 16. By the way, arrows in FIGS. 11A and 11B indicate directions of bending.

Thus, in the present embodiment, it is possible to provide the display face 2a of the display part 2 with flexibility of both convex bending and concave bending. Even if an interface using the flexibility is provided, i.e., even if a function of conducting analog detection of flexibility to distinguish between, for example, two directions indicated by FIG. 11A and FIG. 11B is provided, the user can sensuously find its usable flexibility limits. Therefore, it becomes possible to prevent degradation of the display function or damage of the display device itself at the time of use of the display device. It is possible to set a flexibility range at a minimum curvature of the display device.

In the first to third embodiments, the restriction part is disposed on the side of the display part 2 opposite to the display face 2a. If each restriction part is formed of a transparent material, however, the restriction part may be on the display face 2a side of the display part 2.

Fourth Embodiment

Figure 12:
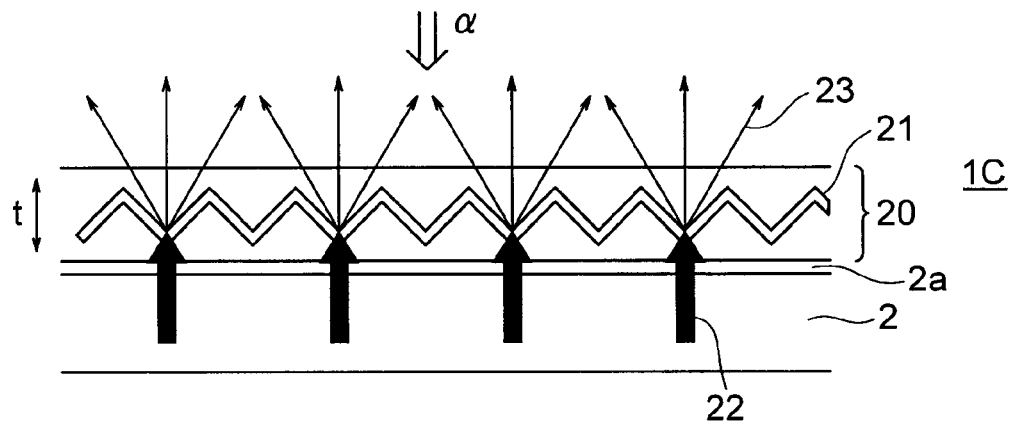
FIG. 12 is a cross-sectional view of a display device according to a fourth embodiment of the present invention.

A cross-sectional view of a display device 1C according to a fourth embodiment of the present invention is shown in FIG. 12. The display device 1C according to the present embodiment includes a flexible display part 2, and an optical control part 20 which is provided on the display face 2a side of the display part 2 and which makes possible outside a flexibility range of the display part 2 an optical change different from that in the flexibility range. If the user attempts to bend the display device to the outside of the flexibility range, therefore, it is possible to inform the user of the range by an optical change such as a change in display luminance.

Figure 13:
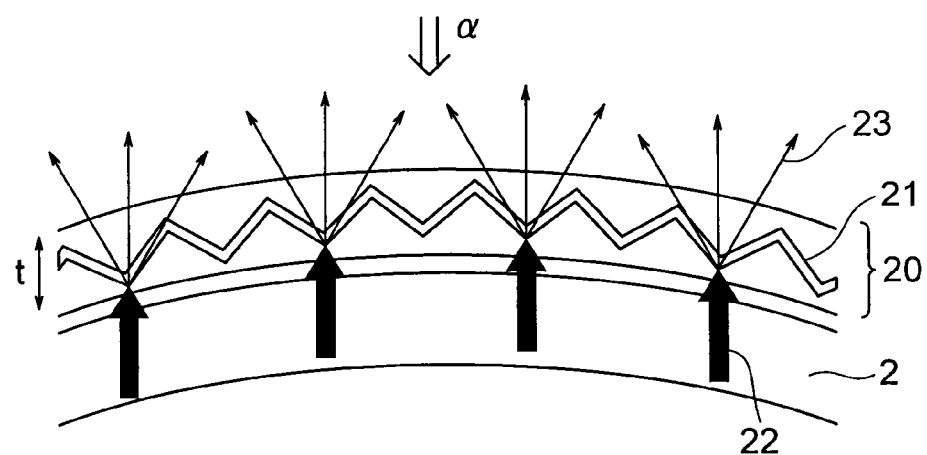
FIG. 13 is a cross-sectional view for explaining operation of the display device according to the fourth embodiment.

In the present embodiment, the optical control part 20 is formed of a wave-shaped scattering plate 21. Light 22 going straight on emitted from the display part 2 is scattered by the scattering plate 21 and output from the display device to the outside as scattered light 23. The wave-shaped scattering plate 21 has a structure in which the wave shape spreads when the wave-shaped scattering plate 21 is bent as shown in FIG. 13. In other words, the scattering plate 21 has a structure in which a height difference (a thickness t of the scattering plate 21 in a direction perpendicular to the display face of the display part 2) becomes small when the scattering plate 21 is bent.

Figure 14:
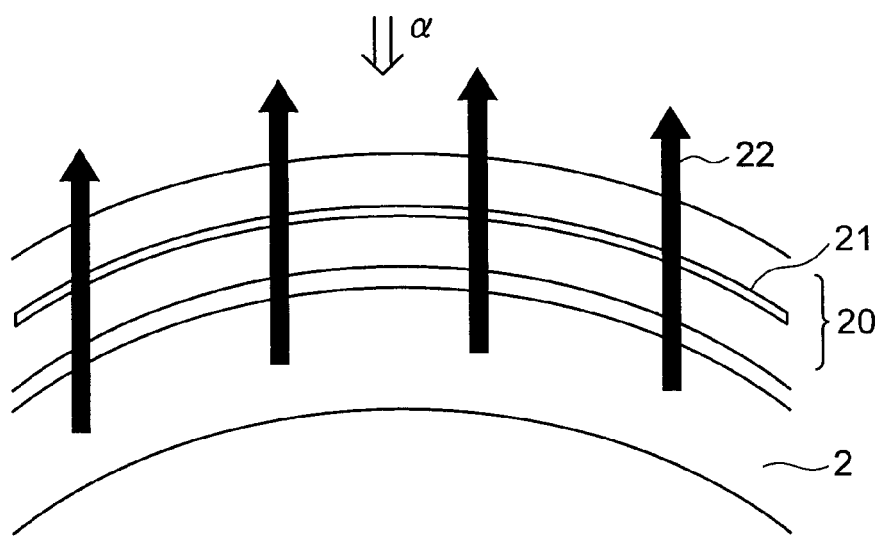
FIG. 14 is a cross-sectional view for explaining operation of the display device according to the fourth embodiment.

If the scattering plate 21 is further bent, then the wave shape is decreased in the scattering plate 21 as shown in FIG. 14, i.e., the height difference in the wave shape almost disappears. In this case, the scattering effect is abruptly lost when incident light 22 is transmitted through the optical control part 20, and consequently the light 22 going straight on is transmitted as it is. If the user watches the display device 1C from above α, therefore, the light rays transmitted through the optical control part 20 changes from the scattered light 23 to the light 22 going straight on. As a result, it becomes possible to give the optical changes shown in FIGS. 12 to 14 to the user who is conducting the bending operation while confirming the display of an image or the like. If the scattered light reducing effect of the optical control part 20 is designed near the usable range at the smallest curvature of the display part 2, the user of the display device according to the present embodiment can understand on the basis of the change of the display state while operating near the limit of the flexibility of the display device. As a result, it becomes possible to prevent use exceeding the flexibility usable range and prevent the degradation of the display function and damage of the display device. In the present embodiment, the optical control part 20 is symmetric in the sectional direction. Whether the display face is bent in the concave form or in the convex form, therefore, the optical control part can be made to operate in the same way.

Figure 15:
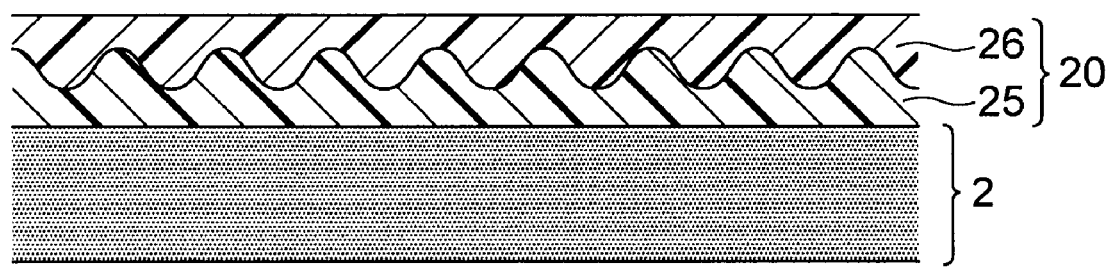
FIG. 15 is a cross-sectional view showing a specific example of an optical control part in the display device according to the fourth embodiment.

The optical control part 20 in the display device according to the present embodiment can be formed of organic resin layers 25 and 26 as shown in FIG. 15.

Figure 16:
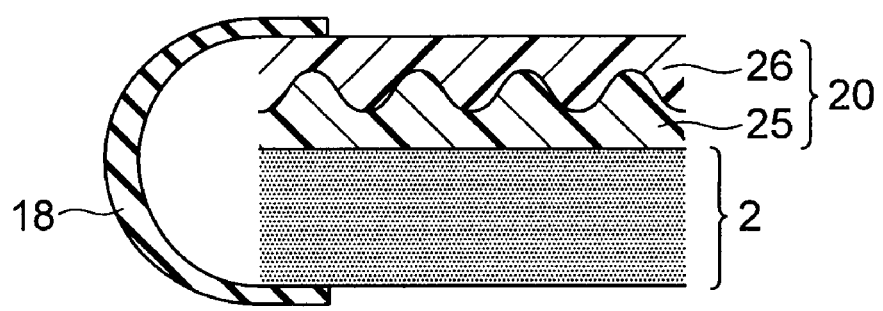
FIG. 16 is a cross-sectional view showing an end part of the display device according to the fourth embodiment.

In the display device according to the present embodiment, the end part of the display device is sealed by a seal part 18 formed of, for example, butadiene rubber as shown in FIG. 16.

According to the present embodiment, it is possible to optically inform the user of the allowable range of the flexibility as heretofore described.

Fifth Embodiment

Figure 17:
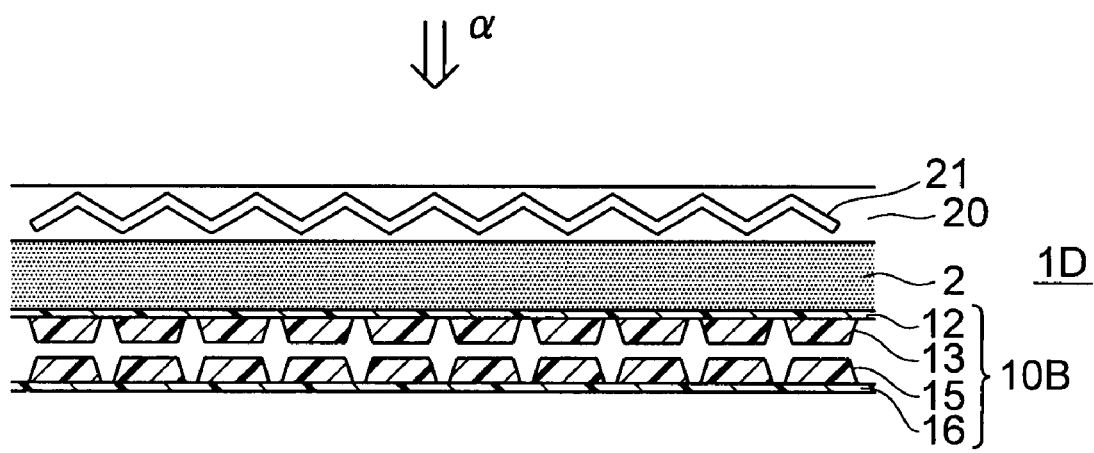
FIG. 17 is a cross-sectional view of a display device according to a fifth embodiment of the present invention.

A cross-sectional view of a display device according to a fifth embodiment of the present invention is shown in FIG. 17. The display device 1D according to the present embodiment has a configuration obtained from the display device according to the third embodiment shown in FIG. 10 by providing the optical control part 20 described with reference to the fourth embodiment across the display part 2 from the restriction part 10B. In other words, an optical control part 20 including a scattering plate 21 which changes in the scattering state in the vicinity of the usable range at the smallest curvature of the display part 2 is provided on one face of the display part 2. In addition, a stress restriction part 10B which includes two layers each having a plurality of convex parts and which can limit the amount of bending in the vicinity of the usable range at the smallest curvature of the display part 2 is provided on a face of the display part 2 opposite to the face on which the optical control part 20 is provided.

Owing to such a configuration, it is possible to inform the user of the usable limit at the smallest curvature dynamically and optically at the same time. In FIG. 17, the user observes the display device 1D from above α (upper part of FIG. 17).

In the present embodiment, it is possible to form a display device in which the optical change and dynamical change can be caused at the same time in the vicinity of the usable range at the smallest curvature of the display part 2. By adopting the present structure, it becomes possible for the user to bodily sense the vicinity of the usable range at the smallest curvature of the display part 2 visually and sensuously in real time. As a result, it is possible to prevent degradation of the display performance and damage of the display device which might be caused by bending the display device excessively.

Figure 18:
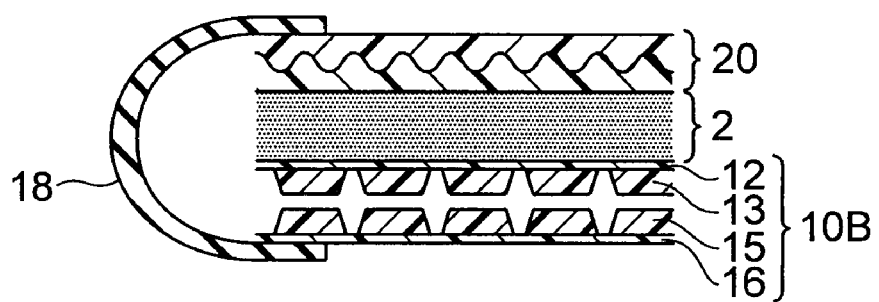
FIG. 18 is a cross-sectional view showing an end part of the display device according to the fifth embodiment.

In the present embodiment, the end part of the display device 1D is sealed by a seal part 18 formed of, for example, butadiene rubber as shown in FIG. 18.

Figure 19:
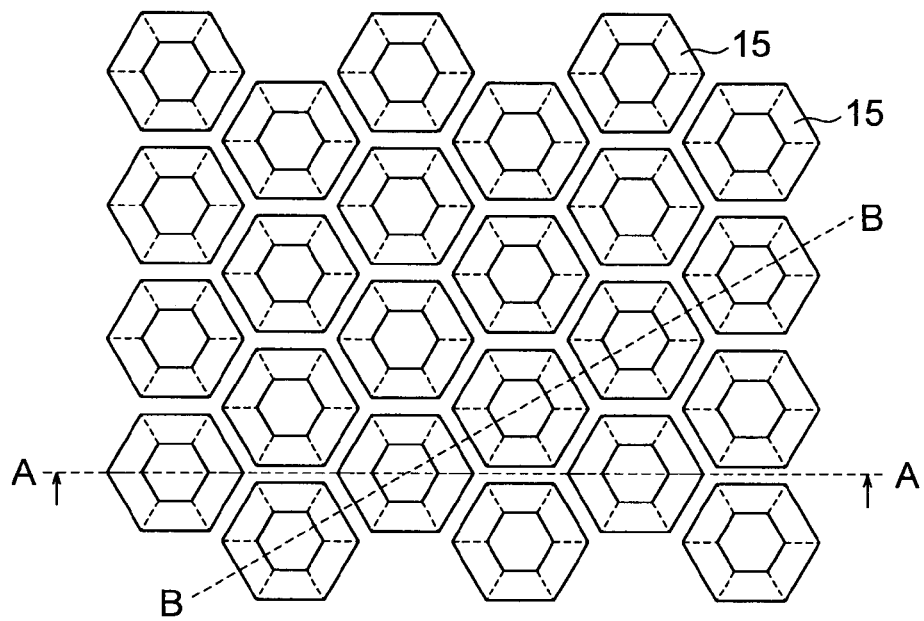
FIG. 19 is a plan view showing a specific example of a stress restriction part according to each embodiment of the present invention.
Figure 20:
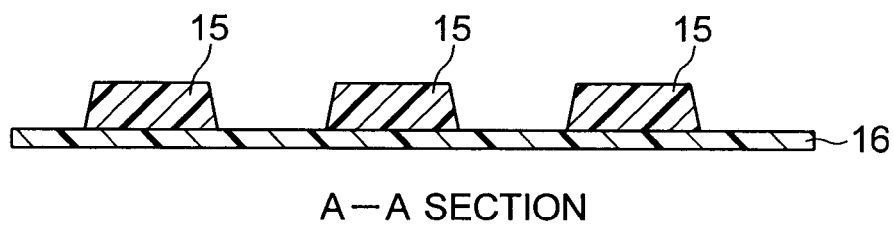
FIG. 20 is a cross-sectional view obtained when the stress restriction part is cut off along a cutoff line A-A shown in FIG. 19.
Figure 21:
FIG. 21 is a cross-sectional view obtained when the stress restriction part is cut off along a cutoff line B-B shown in FIG. 19.

In the first to fifth embodiments, the direction in which the flexibility can be controlled is described to be one-axis direction. However, the present invention is not limited to this. It is also possible to give a dynamic change or an optical change in the vicinity of the usable range at the smallest curvature of the display part 2 in an arbitrary direction. A plan view of a restriction part capable of giving a dynamic change in an arbitrary direction is shown in FIG. 19. A cross-sectional view obtained by cutting the restriction part along a cutoff line A-A shown in FIG. 19 is shown in FIG. 20. A cross-sectional view obtained by cutting the restriction part along a cutoff line B-B shown in FIG. 19 is shown in FIG. 21. The restriction part includes a plurality of convex parts 15 arranged regularly on a support substrate 16. Each of the convex parts takes a hexagonal plan shape. A sectional shape obtained by cutting a convex part 15 along a cutoff line A-A, which passes through opposed vertexes of the hexagon, is trapezoidal as shown in FIG. 20. A sectional shape obtained by cutting a convex part 15 along a cutoff line B-B which passes through centers of opposed sides of the hexagon is trapezoidal as shown in FIG. 21. In other words, each of the convex parts 15 takes a hexagonal plan shape and takes a trapezoidal sectional shape.

Figure 22A:
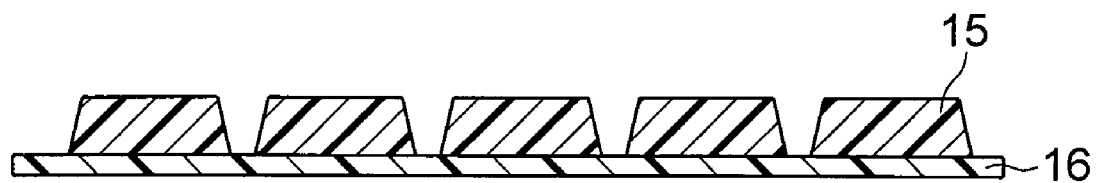
FIGS. 22A to 22C are cross-sectional views for explaining operation of the stress restriction part shown in FIG. 19.
Figure 22B:
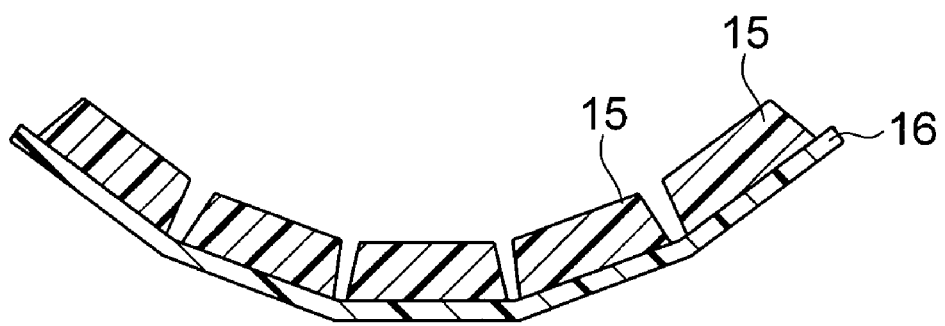
Figure 22C:
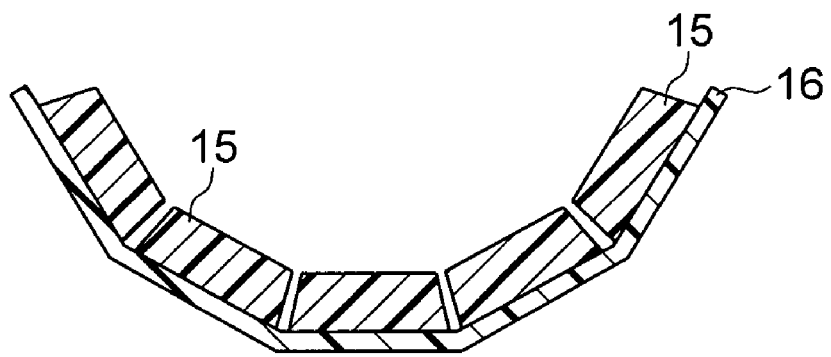

If the convex parts 15 having such a structure are used, it becomes possible to give a dynamic change in an arbitrary direction. FIGS. 22A, 22B and 22C are cross-sectional views showing change examples taken along the B-B section at the time of bending. When the convex parts 15 each having a trapezoidal shape are in some bending state (for example, in the case shown in, for example, FIG. 22C), side faces of the convex parts 15 come in contact with each and consequently a dynamic change can be given. In the restriction part having the structure shown in FIG. 19, therefore, contact can be ensured whichever sectional direction the restriction part is bent in. As a result, it becomes possible to give a dynamic change in an arbitrary direction.

Figure 23:
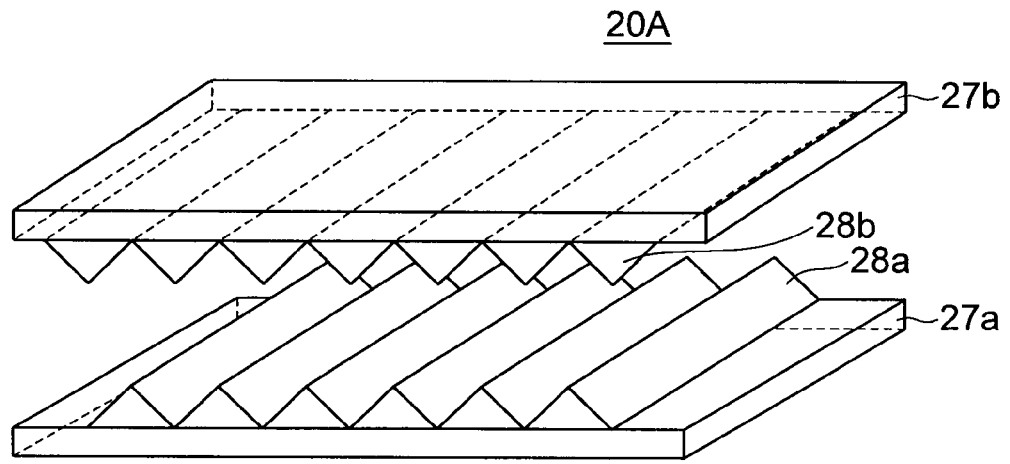
FIG. 23 is an oblique view showing an example of an optical control part in a display device according to an embodiment of the present invention.

As for the optical change, a change can be given to light introduced from a light source installed in the lateral direction. An oblique view of an optical control part 20A having this optical control function is shown in FIG. 23. The optical control part includes two support substrates 27a and 27b, and a plurality of prisms 28a and 28b having triangular section shapes formed respectively on the support substrates 27a and 27b. The prisms 28a and 28b are arranged in parallel. The support substrates 27a and 27b are arranged so as to oppose faces on which the prisms 28a and 28b are formed. The support substrates 27a and 27b and the prisms 28a and 28b are formed of transparent materials.

Figure 24:
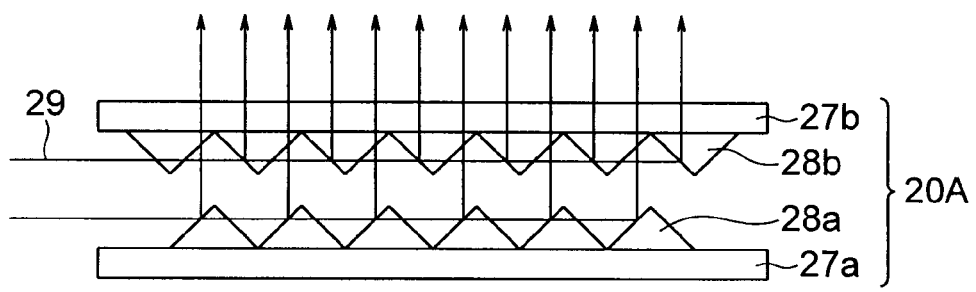
FIG. 24 is a cross-sectional view for explaining operation of the optical control part shown in FIG. 23.
Figure 25:
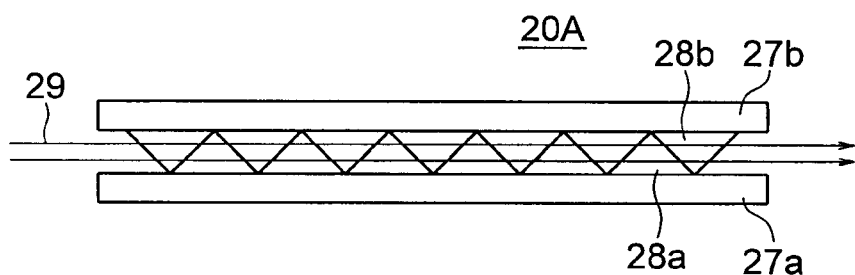
FIG. 25 is a cross-sectional view for explaining operation of the optical control part shown in FIG. 23.
Figure 26:
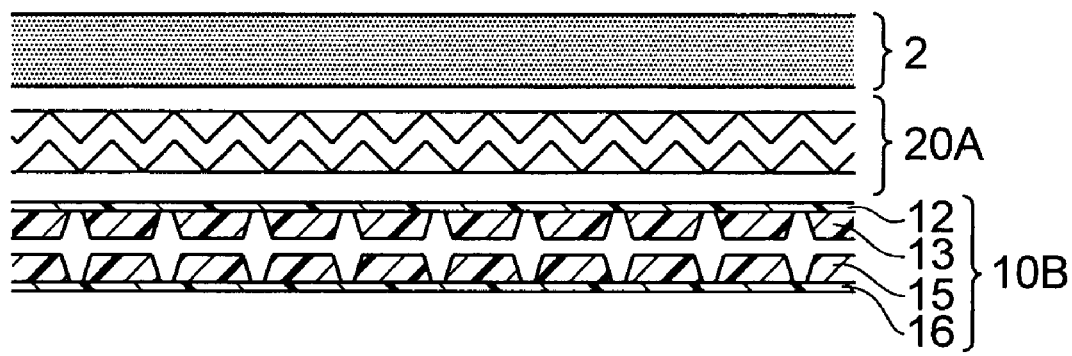
FIG. 26 is a cross-sectional view of a display device according to an embodiment of the present invention using the optical control part shown in FIG. 23.
Figure 27:
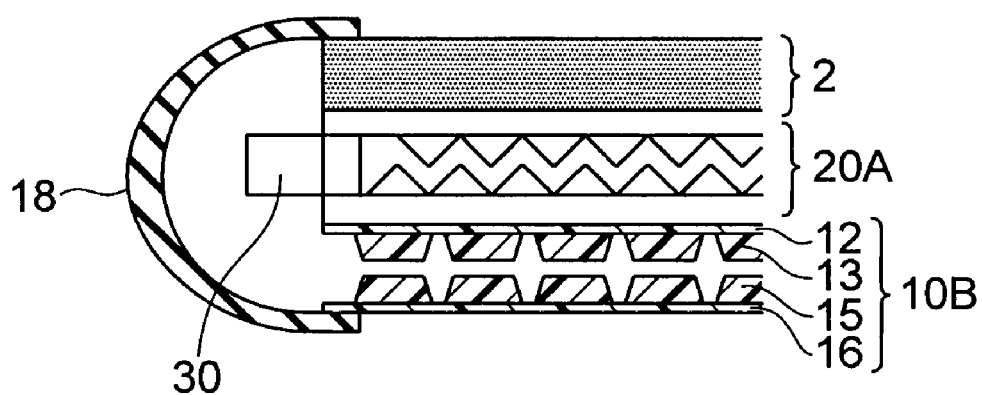
FIG. 27 is a cross-sectional view showing an end part of the display device shown in FIG. 26.

If the optical control part has a gap between two prisms opposed to each other in section as shown in FIG. 24, introduced light 29 is scattered by the prisms 28a and 28b in a direction perpendicular to substrate faces of the support substrates 27a and 27b. If the prisms 28a and 28b are in contact with each other as shown in FIG. 25, however, the introduced light 29 becomes hard to be scattered and it passes through in the lateral direction. A section of the display device using the optical control part 20A is shown in FIG. 26. The display device has a configuration obtained by providing the restriction part 10B described with reference to the third embodiment across the display part 2 from the display face and providing the optical control part 20A between the display part 2 and the restriction part 10B. In the display device, the optical control part 20A is formed so as to cause the distance between the support substrates 27a and 27b to become smaller as the display part 2 is bent and eventually cause the prisms 28a and 28b to come in contact with each other. As shown in FIG. 27, a light source 30 serving as a backlight is provided at an end of the optical control part 20A. The end part of the display device is sealed by a seal part 18 formed of, for example, butadiene rubber. As a result, control on the light output side becomes possible even in a system using introduced light such as LED backlighting system.

If the display device is formed so as to cause the prisms 28a and 28b to come in contact with each other when the bending of the display device caused by external force exceeds the allowable range of the flexibility, then light is not emitted from the display face of the display part 2 as shown in FIG. 25 when the bending of the display device exceeds the allowable range of the flexibility. As a result, it is possible to inform the user of the allowable limit of the flexibility optically as well. Since the restriction part 10B is also provided, it is a matter of course that the user can be informed of the allowable limit of the flexibility dynamically as well.

The display device according to the embodiment of the present invention shown in FIG. 26 includes the restriction part 10B and the optical control part 20A. Alternatively, the display device may have only the optical control part 20A.

Figure 28:
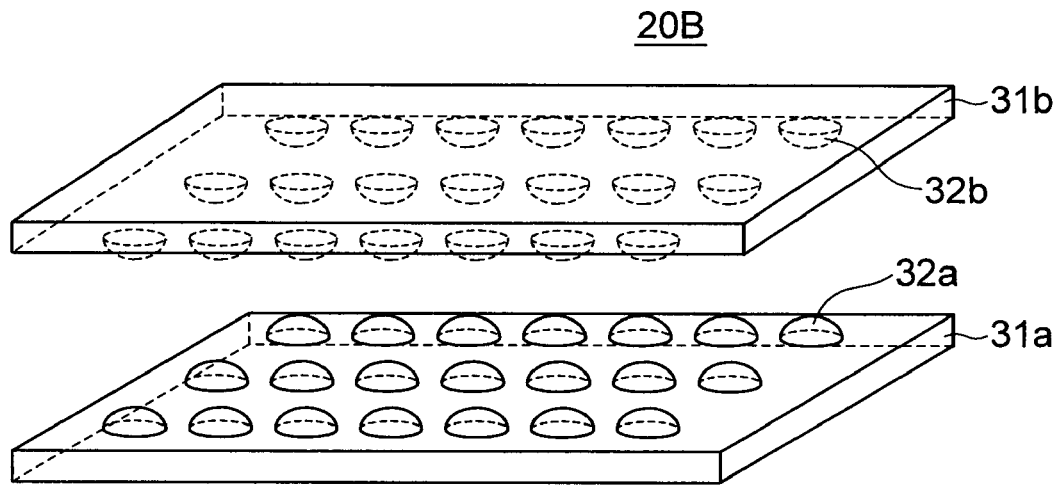
FIG. 28 is an oblique view showing an other example of an optical control part in a display device according to an embodiment of the present invention.
Figure 29:
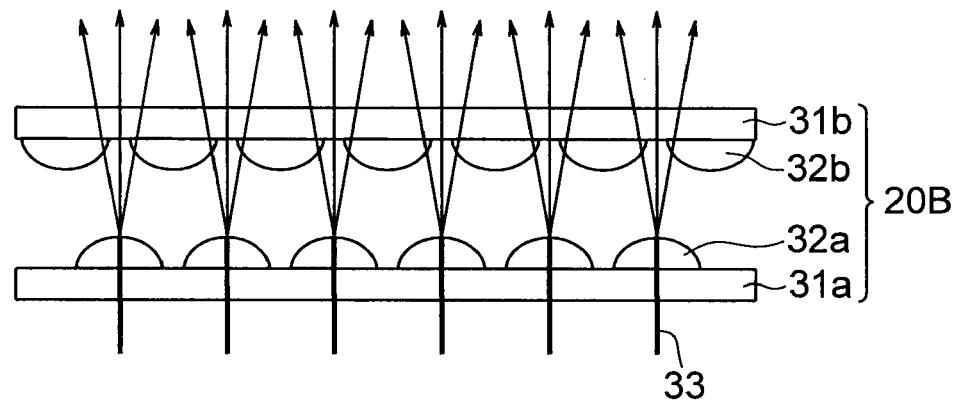
FIG. 29 is a cross-sectional view for explaining operation of the optical control part shown in FIG. 28.
Figure 30:
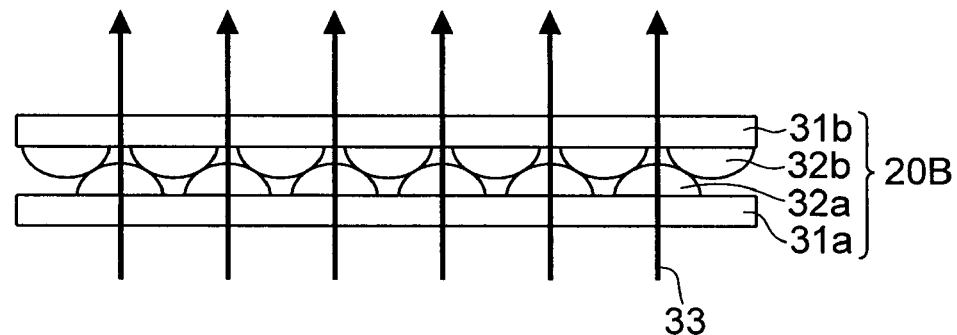
FIG. 30 is a cross-sectional view for explaining operation of the optical control part shown in FIG. 28.

An oblique view of another example of the optical control part for bringing about an optical change is shown in FIG. 28. An optical control part 20B has a configuration obtained by arranging a plurality of projection parts 32a and 32b respectively on film substrates 31a and 31b having excellent permeability in the visible light region so as to oppose the projection parts 32a and 32b each other. Each projection in the projection parts 32a and 32b is obtained by forming plastic resin having low hardness to take the shape of a hemisphere. If there is a gap between the substrates 31a and 31b as shown in FIG. 29, light 33 introduced from the back is scattered by the hemispherical projection parts 32a and consequently emitted light becomes scattered light. In the state in which the projection parts 32a and 32b are in contact with each other as shown in FIG. 30, however, the hemispherical projection parts 32a and 32b are deformed and stuck fast to each other, and consequently the light 33 introduced from the back becomes hard to be scattered and light that is hard to be scattered is emitted as emission light. In the case where the optical control part 20B is used in the flexible display part, the optical control part 20B is formed so as to cause the distance between the film substrates 31a and 31b to become smaller as the display part 2 is bent and eventually cause the projection parts 32a and 32b to stick fast to each other.

Hereafter, embodiments of the present invention will be described in more detail with reference to examples.

First Example

A first example of the present invention is a manufacturing method of a display device. The display device manufactured using this manufacturing method is a liquid crystal display formed on a flexible substrate. A dynamical change is given in the vicinity of the usable range at the smallest curvature of the display part of the liquid crystal display.

The manufacturing method in the present example will be described with reference to FIGS. 31A to 34C.

The liquid crystal display is a liquid crystal display using polysilicon thin film transistors, in which a driver can be partially introduced into the display device main body to reduce the number of pull-out electrodes and thereby ensure the peripheral flexibility. Hereafter, a manufacturing method for the liquid crystal display will be described.

Figure 31A:
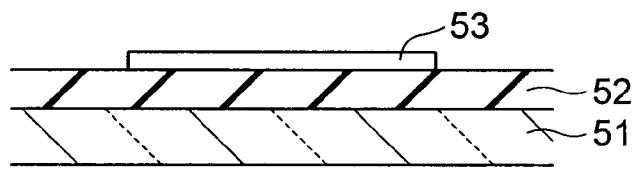
FIGS. 31A to 31C are manufacturing process cross-sectional views showing a manufacturing method of the display device according to a first example of the present invention.

First, as shown in FIG. 31A, on a fully washed alkali-less glass substrate 51, a silicon oxide film or silicon nitride film 52 serving as an undercoat layer with the object of preventing elution of an alkali component from the glass substrate 51 is deposited by using, for example, the plasma excited metal organic chemical vapor deposition (PEMOCVD) method and using aluminum trimethyl or the like as a raw material. Subsequently, an amorphous silicon film is grown by using, for example, the PECVD method, and then exposed to excimer laser using KrF or the like, thereby melted instantaneously, and crystallized to become polycrystalline. Device isolation of the polycrystalline silicon film is conducted by means of, for example, anisotropic etching method using the reactive ion etching method (RIE method) and fluorine gas, and an island structure 53 is formed of polycrystalline silicon (FIG. 31A).

Figure 31B:
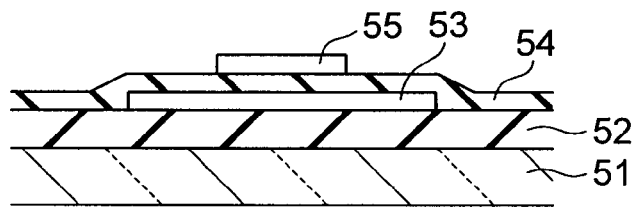

Subsequently, a silicon oxide film or silicon nitride film serving as an insulation film 54 for gate is formed by using, for example, the plasma excited chemical vapor deposition method (PECVD method) as shown in FIG. 31B. And a metal film of Mo, W, Ta or their alloy is deposited on the insulation film 54 by using, for example, the sputtering method. Thereafter, the shape of a gate electrode 55 and a gate line group (not illustrated) is worked using a method of applying a photoresist onto the metal film, forming a resist pattern (not illustrated) with the photolithography method, impregnating the whole with, for example, a solvent, and selectively removing the metal film in portions having no resist pattern (FIG. 31B).

Figure 31C:
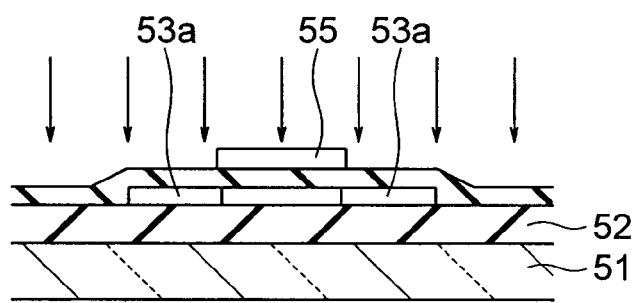

Subsequently, impurity introduction of a thin film transistor is conducted to form a junction face in a semiconductor layer 53 as shown in FIG. 31C. In the present example, phosphorus (P) is used as impurities. At this time, ions are introduced by using a gate electrode 55 as a mask and using the ion doping method so as to make the ion concentration equal to approximately $10^{22}$ cm$^{-3}$. Thus, a source-drain 53a is formed. Thereafter, heat treatment is conducted to activate the introduced impurities P.

Figure 32A:
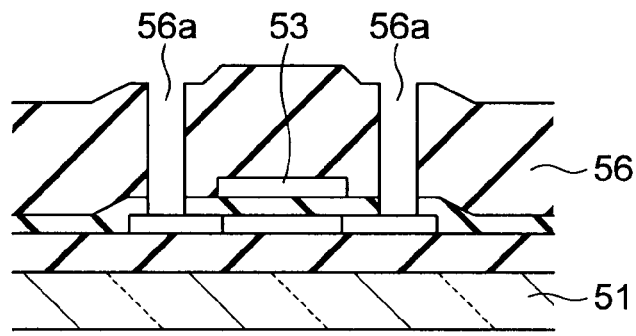
FIGS. 32A and 32B are manufacturing process cross-sectional views showing a manufacturing method of the display device according to a first example of the present invention.
Figure 32B:
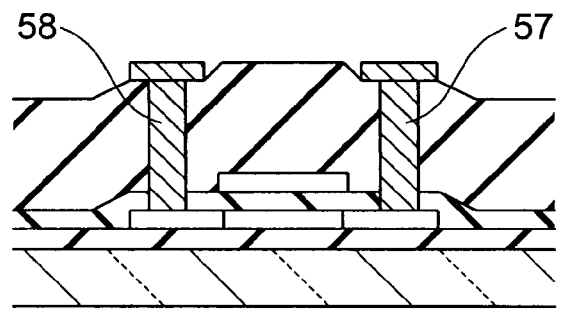

Subsequently, a silicon oxide film or a silicon nitride film serving as an interlayer insulation film 56 is formed by using, for example, the atmospheric pressure chemical vapor deposition method (APCVD method) as shown in FIG. 32A. Thereafter, contact holes 56a are formed to bring the source and drain electrodes into contact with the semiconductor layer by using the photoetching process. Metal such as Mo, Ta, W, Al or Ni, or their alloys, or a laminate film is deposited by using, for example, the sputtering method. Thereafter, a source electrode 57, a signal line group, and a drain electrode 58 are formed by using the photoetching process in the same way as at the time of gate electrode formation. In addition, a pixel electrode 58 is formed so as to be connected to the source electrode 57 as shown in FIG. 32B. In the series of thin film transistor and wiring forming process, there is, for example, a thermal process of at least 500° C. In the alkali-less glass substrate used in the present example, however, the thermal process can be used without posing a problem when forming the active matrix structure.

A process for shifting the active matrix substrate having thin film transistors formed as described above to a flexible substrate such as a plastic substrate will now be described.

Figure 33A:
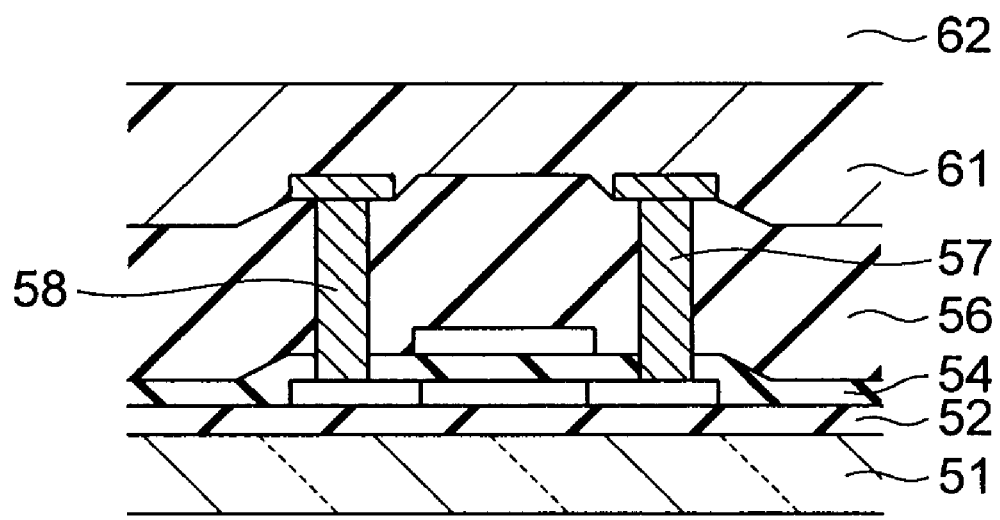
FIGS. 33A and 33B are manufacturing process cross-sectional views showing a manufacturing method of the display device according to a first example of the present invention.

As shown in FIG. 33A, an adhesive agent which is weakened in adhesive strength when exposed to, for example, ultraviolet rays and which is excellent in resistance against fluoric acid is applied to the surface of the active matrix substrate leaving no space to form a tentatively adhered layer 61. For example, a fluorine resin sheet 62 which is coated on the adhesive face to improve the adhesive property with respect to an organic material and which is excellent in resistance against fluoric acid is formed across the tentatively adhered layer 61 from the alkali-less glass substrate.

Figure 33B:
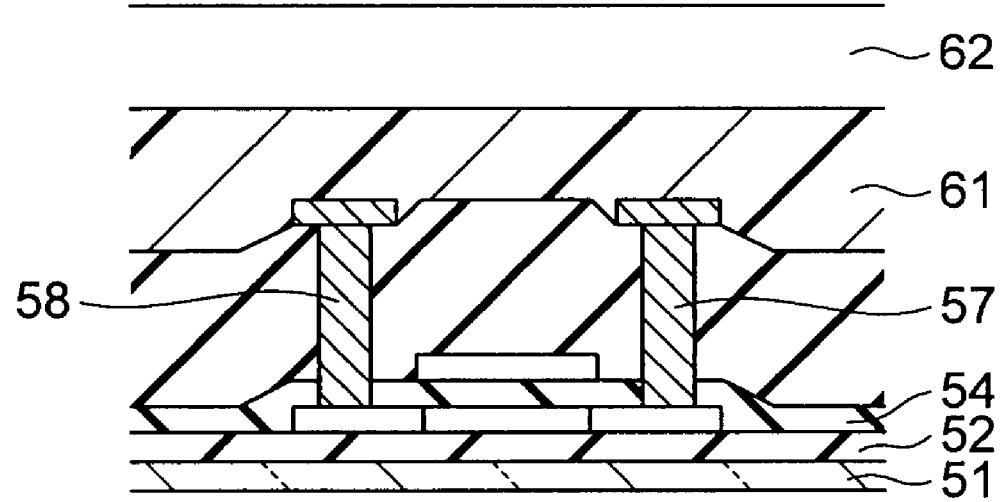
Figure 34A:
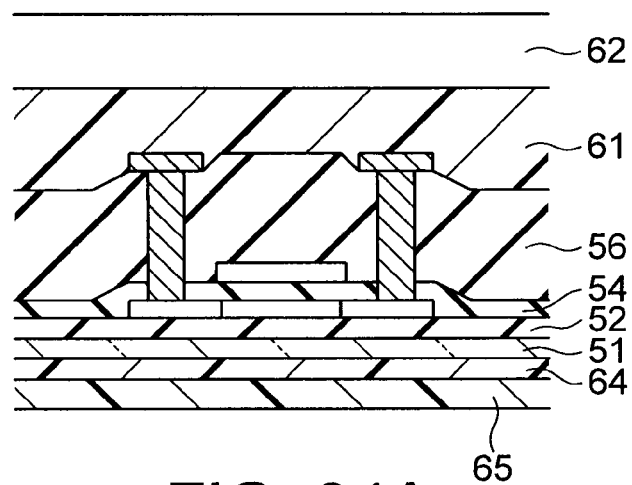
FIGS. 34A to 34C are manufacturing process cross-sectional views showing a manufacturing method of the display device according to a first example of the present invention.

Subsequently, the active matrix substrate is polished up to a thickness of approximately 0.1 mm from the back side of the alkali-less glass substrate 51 by using an abrasive while adjusting the roughness of the abrasive. Thereafter, the active matrix substrate is impregnated with a fluoric acid solvent, and the alkali-less glass substrate 51 is dissolved up to a thickness of approximately 30 μm (FIG. 33B). After the alkali-less glass substrate 51 has become thin, it is desirable to use, for example, a fluoric acid solution with ammonium or the like added which is adjusted in etching rate. After the active matrix substrate is fully washed, an adhesive layer 64 is formed on the whole of the etched face of the alkali-less glass substrate 51 by using an adhesive agent having an excellent adhesion property (FIG. 34A). A polyether amido resin (PES) film having approximately 0.1 mmt is adhered to a side of the adhesive layer 64 opposite to the alkali-less glass substrate 51 as a support substrate 65 by using the vacuum laminate technique (FIG. 34A). In the present example, the PES substrate is used as the support substrate 65. In the present manufacturing method, other plastic substrates may also be used. It has already been confirmed that, for example, a polyethylene terephthalate (PET) resin film having a thickness of 0.1 mm can also be formed.

Figure 34B:
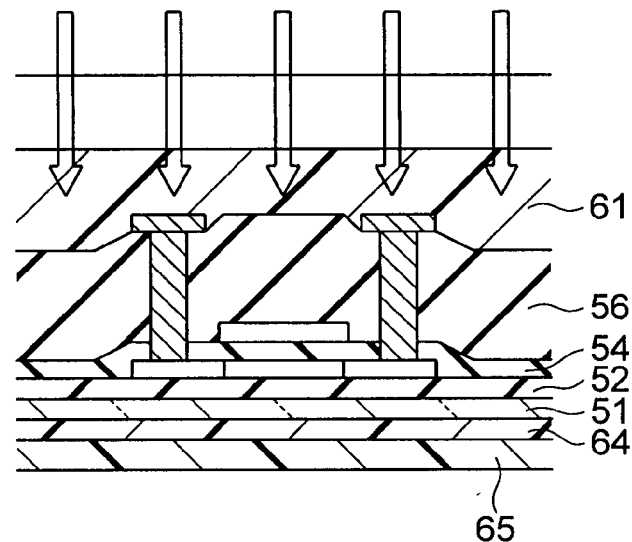
Figure 34C:
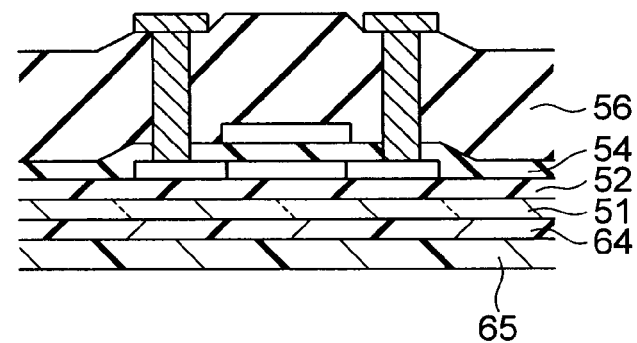

Subsequently, as shown in FIG. 34B, ultraviolet rays are applied from the resin sheet 62 side to weaken the adhesive strength of the tentatively adhered layer 61. The resin sheet 62 which has been used as the support substrate is peeled off slowly to expose the surface of the active matrix layer such as the interlayer insulation layer 56. At this time, a component remainder of the tentatively adhered layer 61 is generated. This is removed with an organic washing method using isopropanol or the like to expose the washed face (FIG. 34C). The flexible active matrix substrate using polysilicon thus formed and an opposite substrate having a transparent conductive film of indium tin or the like are opposed to each other, and a liquid crystal display is fabricated by using a cell process. A process which is the same as that for the liquid crystal display capable of coping with simple matrix drive is used as the cell process at this time.

A method for forming convex parts will now be described. The convex parts have negative relations to trapezoidal shapes which can be controlled in the vicinity of the usable range at the smallest desired curvature. For example, a film of a silicone resin which can be hardened by, for example, two-solution mixture is formed on a surface of a mold substrate which is a substrate obtained by fine working of the surface of stainless steel, using the spin coat method. The temperature is raised up to a temperature at which the coat solution is hardened, and hardening is conducted. Thereafter, convex parts including a continuous body having desired trapezoidal shapes are peeled off from the mold substrate. At this time, the thickness of the layer which supports the continuous body having desired trapezoidal shapes can be controlled by using the number of revolutions in the spin coat method. Two such layers are fabricated. A peripheral part is drawn on one of the layers by using, for example, a sealant which can be formed to have a desired cell thickness and which includes distributed spacers. Thereafter, convex parts of the other layer are adhered in opposite position relations. At this time, spacers which are smaller than the spacers introduced into the peripheral part may be distributed in a plane so as to be able to maintain the gaps of the convex parts not only in the peripheral part but also in the plane having trapezoidal shapes. By adding this across the flexible liquid crystal display formed as described above from the display face, it becomes possible to form a liquid crystal display capable of giving a dynamical change function in the vicinity of the usable range at the smallest curvature.

Second Example

The present example shows an example of a manufacturing method for a flexible spontaneous light emitting display device capable of giving an optical change in the vicinity of the usable range at the smallest curvature by using organic EL as the optical control part.

The display device is a display device using polysilicon thin film transistors, in which a driver can be partially introduced into the display device main body to reduce the number of pull-out electrodes and thereby ensure the peripheral flexibility. Hereafter, a manufacturing method for the display device will be described.

First, on a fully washed alkali-less glass substrate 51, a silicon oxide film or silicon nitride film 52 serving as an undercoat layer with the object of preventing elution of an alkali component from the glass substrate is deposited by using, for example, the plasma enhanced metal organic chemical vapor deposition (PE-MOCVD) method and using aluminum trimethyl or the like as a raw material.

Subsequently, an amorphous silicon film is grown by using, for example, the PECVD method, and then exposed to excimer laser using KrF or the like, thereby melted instantaneously, and crystallized to become polycrystalline. Device isolation of the polycrystalline silicon film is conducted by means of, for example, anisotropic etching method using the reactive ion etching method (RIE method) and fluorine gas, and an island structure 53 is formed.

Subsequently, a silicon oxide film or silicon nitride film serving as an insulation film 54 for gate is formed using, for example, the plasma excited chemical vapor deposition method (PECVD method). And a metal film of Mo, W, Ta or their alloy is deposited on an alumina film by using, for example, the sputtering method. Thereafter, the shape of a gate electrode 55 and a gate line group is worked using a method of applying a photoresist onto the metal film, forming a resist pattern with the photolithography method, impregnating the whole with, for example, a solvent, and selectively removing the metal film in portions having no resist pattern. Subsequently, impurity introduction of a thin film transistor is conducted to form a junction face in a semiconductor layer. In the present example, phosphorus (P) is used as impurities. At this time, ions are introduced into a polycrystalline silicon layer 53 by using a gate electrode 55 as a mask and using the ion doping method so as to make the ion concentration equal to approximately $10^{22}$ cm$^{-3}$. Thus, heat treatment is conducted to make the introduced impurities P function. A silicon oxide film or silicon nitride film serving as the interlayer insulation film 56 is formed, for example, by the atmospheric pressure chemical vapor deposition method (APCVD method).

Thereafter, through holes are formed to bring the source and drain electrodes into contact with the semiconductor layer via the interlayer insulation film 56 and the insulation film 54 by using the photoetching process. Metal such as Mo, Ta, W, Al or Ni, or their alloys, or a laminate film is deposited by using, for example, the sputtering method. Thereafter, a source electrode 57, a signal line group, and a drain electrode 58 are formed by using the photoetching process in the same way as at the time of gate electrode formation. In addition, a pixel electrode 58 is formed so as to be connected to the source electrode 57. In the series of thin film transistor and wiring forming process, there is, for example, a thermal process of at least 500° C. In the alkali-less glass substrate used in the present example, however, the thermal process can be used without posing a problem when forming the active matrix structure.

A process for shifting the active matrix substrate to a flexible substrate such as a plastic substrate is shown in FIGS. 33A to 34C. An adhesive agent which is weakened in adhesive strength when exposed to, for example, ultraviolet rays and which is excellent in resistance against fluoric acid is applied to the surface of the substrate leaving no space to form a tentatively adhered layer 61. For example, a fluorine resin sheet 62 which is coated on the adhesive face to improve the adhesive property with respect to an organic material and which is excellent in resistance against fluoric acid is formed across the tentatively adhered layer 61 from the alkali-less glass substrate. Subsequently, the substrate supported by the both faces is polished up to a thickness of approximately 0.1 mm from the back side of the alkali-less glass substrate 51 by using an abrasive while adjusting the roughness of the abrasive. Thereafter, the active matrix substrate is impregnated with a fluoric acid solvent, and the alkali-less glass substrate 63 is dissolved up to a thickness of approximately 30 µm. After the alkali-less glass substrate 51 has become thin, it is desirable to use, for example, a fluoric acid solution with ammonium or the like added which is adjusted in etching rate. After the active matrix substrate is fully washed, an adhesive layer 64 is formed on the whole of the etched face of the alkali-less glass substrate by using an adhesive agent having an excellent adhesion property. A polyether amido resin (PES) film having approximately 0.1 mmt is adhered to a side of the adhesive layer 64 opposite to the alkali-less glass substrate as a support substrate 65 by using the vacuum laminate technique.

In the present example, the PES substrate is used as the support substrate 65. In the present manufacturing method, other plastic substrates may also be used. It has already been confirmed that, for example, a polyethylene terephthalate (PET) resin film having 0.1 mmt can also be formed. Subsequently, ultraviolet rays are applied from the resin sheet 62 side to weaken the adhesive strength of the tentatively adhered layer 61. The resin sheet 62 which has been used as the support substrate is peeled off slowly to expose the surface of the active matrix layer such as the interlayer insulation layer 56. At this time, a component remainder of the tentatively adhered layer 61 is generated. This is removed with an organic washing method using isopropanol or the like to expose the washed face.

An organic EL layer is deposited on the surface by using, for example, the evaporation method. Thereafter, a hole implantation layer made of PDOT/PSS is formed by using the spin coat method. A film of indium tin oxide is formed on the organic EL layer by using, for example, the sputtering method. By covering the whole surface with silicon resin having excellent dampproofness or the like, a flexible active matrix type organic EL display device is formed.

A method for forming the optical control part will now be described. The optical control part can be worked by sandwiching a workable film such as a polyethylene terephthalate film which is permeable in the visible light region between a first mold substrate, which is a substrate obtained by applying fine working to, for example, the stainless surface and a second mold substrate, which is just inverted in convex-concave relations as compared with the first mold substrate and which is a substrate obtained by applying fine working to, for example, the stainless surface, and then pressurizing them. It becomes possible to form the optical control part by sandwiching both sides thereof between extremely thin films having permeability in the visible light region. By adding this to the display face side of the flexible organic EL display device formed as described above, it becomes possible to form a spontaneous light emitting display device capable of giving a dynamical change function in the vicinity of the usable range at the smallest curvature.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concepts as defined by the appended claims and their equivalents.

What is claimed is:

1. A display device comprising:
   a display part including a display face and being flexible;
   a restriction part comprising a plurality of first convex parts to restrict a bending quantity of the display part; and
   an optical control part provided on the display face side of the display part or between the display part and the restriction part to exercise control so as to change light emitted from the display face of the display part according to bending of the display part, wherein
the optical control part comprises a scattering plate provided on a display face side of the display part, and
the scattering plate is configured so as to make thickness of the scattering plate in a direction perpendicular to the display face small as the display part is bent.

2. The display device according to claim 1, wherein the optical control part comprises a first organic resin layer having a wave shaped surface, and a second organic resin layer formed so as to cover the surface of the first organic resin layer.

3. A display device comprising:
a display part including a display face and being flexible;
a restriction part comprising a plurality of first convex parts to restrict a bending quantity of the display part; and
an optical control part provided on the display face side of the display part or between the display part and the restriction part to exercise control so as to change light emitted from the display face of the display part according to bending of the display part,
wherein
the optical control part comprises a transparent first support substrate, a plurality of first prisms each having a triangular sectional shape arranged in parallel on the first support substrate, a transparent second support substrate, and a plurality of second prisms each having a triangular sectional shape arranged in parallel on the second support substrate,
the first and second support substrates are arranged so as to cause the first and second prisms to be opposed alternately, and
a distance between the first and second support substrates is decreased as the display part is bent.

4. A display device comprising:
a display part including a display face and being flexible;
a restriction part comprising a plurality of first convex parts to restrict a bending quantity of the display part; and
an optical control part provided on the display face side of the display part or between the display part and the restriction part to exercise control so as to change light emitted from the display face of the display part according to bending of the display part,
wherein
the optical control part comprises a transparent first film substrate, a plurality of first projection parts each having a hemispherical shape arranged on the first film substrate, a transparent second film substrate, and a plurality of second projection parts each having a hemispherical shape arranged on the second film substrate,
the first and second film substrates are arranged so as to cause the first and second projection parts to be opposed alternately, and
a distance between the first and second film substrates is decreased as the display part is bent.

5. A display device comprising:
a display part including a display face and being flexible; and
an optical control part provided on the display face side of the display part or on the opposite side to control so as to change light emitted from the display face of the display part according to the bending quantity of the display part,
wherein
the optical control part comprises a scattering plate provided on a display face side of the display part, and
the scattering plate is configured so as to make thickness of the scattering plate in a direction perpendicular to the display face small as the display part is bent.

6. The display device according to claim 5, wherein the optical control part comprises a first organic resin layer having a wave shaped surface, and a second organic resin layer formed so as to cover the surface of the first organic resin layer.

7. A display device comprising:
a display part including a display face and being flexible; and
an optical control part provided on the display face side of the display part or on the opposite side to control so as to change light emitted from the display face of the display part according to the bending quantity of the display part,
wherein
the optical control part comprises a transparent first support substrate, a plurality of first prisms each having a triangular sectional shape arranged in parallel on the first support substrate, a transparent second support substrate, and a plurality of second prisms each having a triangular sectional shape arranged in parallel on the second support substrate,
the first and second support substrates are arranged so as to cause the first and second prisms to be opposed alternately, and
a distance between the first and second support substrates is decreased as the display part is bent.

8. A display device comprising:
a display part including a display face and being flexible; and
an optical control part provided on the display face side of the display part or on the opposite side to control so as to change light emitted from the display face of the display part according to the bending quantity of the display part,
wherein
the optical control part comprises a transparent first film substrate, a plurality of first projection parts each having a hemispherical shape arranged on the first film substrate, a transparent second film substrate, and a plurality of second projection parts each having a hemispherical shape arranged on the second film substrate,
the first and second film substrates are arranged so as to cause the first and second projection parts to be opposed alternately, and
a distance between the first and second film substrates is decreased as the display part is bent.

* * * * *